US011520502B2

(12) United States Patent
Li et al.

(10) Patent No.: US 11,520,502 B2
(45) Date of Patent: Dec. 6, 2022

(54) PERFORMANCE CONTROL FOR A MEMORY SUB-SYSTEM

(71) Applicant: Micron Technology, Inc., Boise, ID (US)

(72) Inventors: Yun Li, Fremont, CA (US); James P. Crowley, Longmont, CO (US); Jiangang Wu, Milpitas, CA (US); Peng Xu, Milpitas, CA (US)

(73) Assignee: Micron Technology, Inc., Boise, ID (US)

( * ) Notice: Subject to any disclaimer, the term of this patent is extended or adjusted under 35 U.S.C. 154(b) by 73 days.

(21) Appl. No.: 16/731,936

(22) Filed: Dec. 31, 2019

(65) Prior Publication Data

US 2021/0200453 A1 Jul. 1, 2021

(51) Int. Cl.
*G06F 3/06* (2006.01)

(52) U.S. Cl.
CPC ............ *G06F 3/0631* (2013.01); *G06F 3/061* (2013.01); *G06F 3/0653* (2013.01); *G06F 3/0656* (2013.01); *G06F 3/0659* (2013.01); *G06F 3/0673* (2013.01)

(58) Field of Classification Search
CPC ...... G06F 3/0631; G06F 3/061; G06F 3/0653; G06F 3/0656; G06F 3/0659; G06F 3/0673
See application file for complete search history.

(56) References Cited

U.S. PATENT DOCUMENTS

| | | | | |
|---|---|---|---|---|
| 8,250,257 B1 * | 8/2012 | Harel | G06F 3/0659 | 711/114 |
| 2001/0014936 A1 * | 8/2001 | Jinzaki | G06F 9/3001 | 711/221 |
| 2007/0268931 A1 * | 11/2007 | Shaikli | H04L 47/6215 | 370/468 |
| 2012/0066439 A1 * | 3/2012 | Fillingim | G06F 11/3433 | 711/103 |
| 2016/0291883 A1 * | 10/2016 | Manohar | G06F 3/0656 | |
| 2017/0285945 A1 * | 10/2017 | Kryvaltsevich | G06F 3/0659 | |
| 2018/0173673 A1 * | 6/2018 | Daglis | G06F 9/524 | |
| 2020/0310986 A1 * | 10/2020 | Kang | G06F 12/0246 | |
| 2020/0356486 A1 * | 11/2020 | Sharma | G06F 12/0811 | |
| 2021/0019181 A1 * | 1/2021 | Zhu | G06F 9/546 | |
| 2021/0064274 A1 * | 3/2021 | Lee | G06F 3/0658 | |

* cited by examiner

*Primary Examiner* — Ryan Bertram
(74) *Attorney, Agent, or Firm* — Holland & Hart LLP

(57) ABSTRACT

Methods, systems, and devices for performance control for a memory sub-system are described. A memory sub-system can monitor a backend for writing data to a memory device. The memory sub-system can determine that the bandwidth of the backend satisfies one or more performance criteria that are based on performance between the memory sub-system and a host system. In some embodiments, the memory sub-system can allocate a quantity of slots of a buffer to a frontend of the memory sub-system based on determining that the bandwidth of the backend satisfies the one or more performance criteria. Slots of the buffer can be configured to receive data from the frontend for writing to the memory device by the backend.

20 Claims, 5 Drawing Sheets

Memory Sub-System 310
325
Frontend Core 315-a
Receive 330
Buffer 345
Host System 305
Translation Core 315-b
Monitor 335
ID Buffer Slots 340
Memory Device 320
Access 350
Backend Core 315-c
300

PERFORMANCE CONTROL FOR A MEMORY SUB-SYSTEM

TECHNICAL FIELD

The following relates generally to a memory sub-system and more specifically to performance control for a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
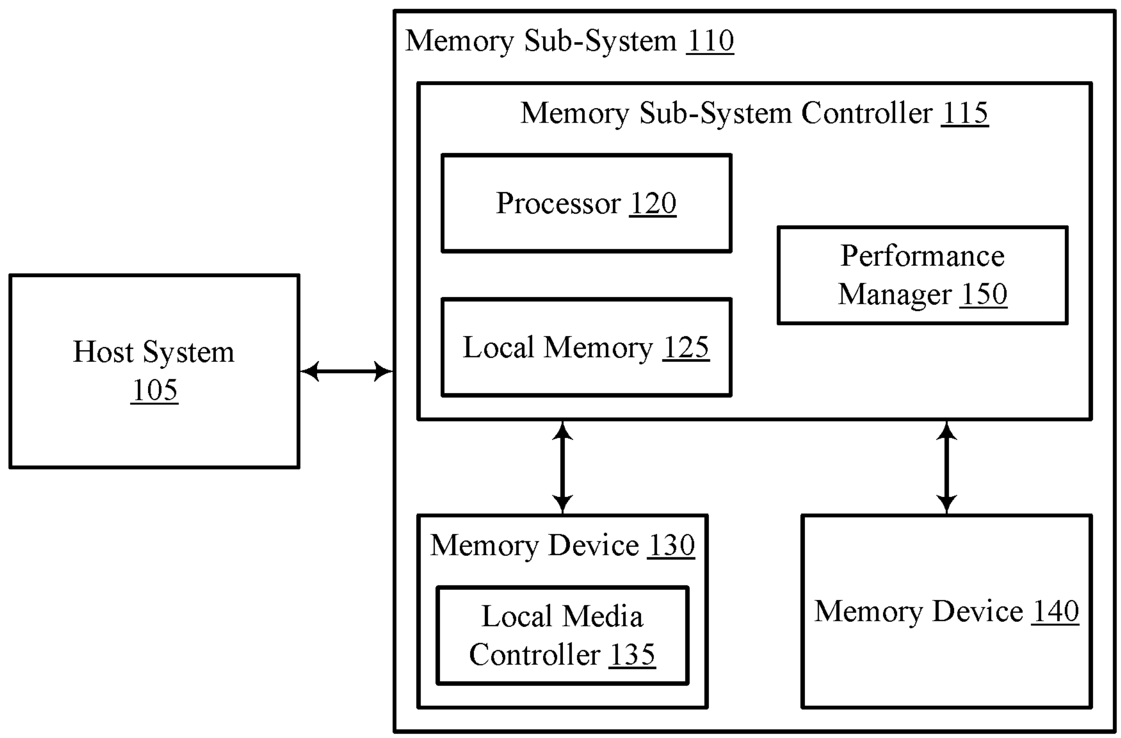
FIG. 1 illustrates an example of a computing system that includes a memory sub-system in accordance with some embodiments of the present disclosure.

Aspects of the present disclosure are directed to performance control for a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

The memory device can be a non-volatile memory device, which is a package of one or more dice. The dice in the packages can be assigned to one or more channels for communicating with a memory sub-system controller. An example of a non-volatile memory device is a negative-and (NAND) memory device. Other examples of non-volatile memory devices are described below in conjunction with FIG. 1.

The host system can initiate a data operation (e.g., write, read, erase, etc.) on a memory sub-system. The host system can send access requests (e.g., write command, read command) to the memory sub-system, such as to store data on a memory device at the memory sub-system and to read data from the memory device on the memory sub-system. Commands can be transmitted from the host system to various memory dice on the memory sub-system. The commands can be associated with different access operations (e.g., read operations, write operations, etc.) to be performed on one or more transfer units (TUs). A TU can refer to a portion of data (e.g., 4 k of data) that can be accessed (e.g., written or read) in a memory device at one time, and an access operation can be associated with one or more TUs (i.e., an access operation can be associated with 4 k or more of data). In some examples, an access command can be received by a frontend core of a memory sub-system and can be processed (e.g., performed) by a backend core. A translation layer (e.g., a translation core) can facilitate communications between the frontend and backend cores.

In some examples, a frontend core can refer to firmware (e.g., a portion of firmware) that is configured as an interface between the host system and the memory sub-system. For example, a frontend core can be configured to receive, process, and/or interpret commands and other communications received from the host system and transmitted to the host system. Additionally or alternatively, a backend core can refer to firmware (e.g., a portion of firmware) that is configured to interface between the memory sub-system and the memory device of the memory sub-system. For example, the backend core can be configured to receive, process, and/or interpret data and other communications received from the memory device and transmitted to the memory device. In some examples, the frontend core and the backend core can communicate directly (e.g., directly with the other) or via a translation core (e.g., a translation layer).

In a memory sub-systems, operations such as access operations and media management operations (e.g., garbage collection operations) can be performed on the memory cells of a memory device. These types of operations can be performed by hardware and/or firmware of the memory sub-system. The hardware and firmware of a traditional memory sub-system can have operational constraints that limit certain operations. That is, the memory sub-system can have a finite amount of bandwidth to perform operations at any given period of time. Accordingly, when a conventional memory sub-system attempts to perform an operation, fluctuation in an amount of available bandwidth can occur. This can be referred to as "bouncing," in some cases. When bandwidth bounces, the performance of the system can fluctuate and the quality of the data written to the memory sub-system can be affected.

Aspects of the present disclosure address the above and other deficiencies by controlling performance (e.g., bandwidth) of a memory subsystem by monitoring bandwidth available and allocating slots of a buffer for storing data associated with access operations. For example, a frontend processing core of a memory sub-system can monitor a total amount of bandwidth available to a backend processing core for performing one or more access operations. The amount of data being stored by the memory device can be controlled by limiting how many slots of a buffer are allocated to a host system to store write data to be written to the memory cells. When an amount of available bandwidth exceeds a performance threshold (e.g., when an amount of bandwidth available is less than an amount of bandwidth required), more buffer slots can be allocated to store data received from a host system. The host system can then send more data to be written based on having more allocated slots. When an amount of bandwidth available to the backend core falls below the performance threshold (e.g., when a requisite amount of bandwidth is available), fewer buffer slots can be allocated to store data received from a host system. Utilizing a buffer in this manner can control the overall performance of the memory sub-system, and can reduce fluctuations in available bandwidth.

Features of the disclosure are initially described in the context of a computing system as described with reference to FIG. 1. Features of the disclosure are described in the context of a flow diagram and block diagrams as described with reference to FIGS. 2-4. These and other features of the disclosure are further illustrated by and described with reference to a computer system that relates to performance control for a memory sub-system as described with reference to FIG. 5.

FIG. 1 illustrates an example of a computing system 100 that includes a memory sub-system in accordance with some embodiments of the present disclosure. The memory sub-system 110 can include media, such as one or more non-volatile memory devices (e.g., memory device(s) 130), one or more volatile memory devices (e.g., memory device(s) 140), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile DIMM (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 105 that is coupled with one or more memory sub-systems 110. In some embodiments, the host system 105 is coupled with different types of memory sub-systems 110. FIG. 1 illustrates one example of a host system 105 coupled with one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 105 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 105 uses the memory sub-system 110, for example, to write data to the memory sub-system 110 and read data from the memory sub-system 110.

The host system 105 can be coupled to the memory sub-system 110 using a physical host interface. Examples of a physical host interface include, but are not limited to, a serial advanced technology attachment (SATA) interface, a peripheral component interconnect express (PCIe) interface, USB interface, Fiber Channel, a double data rate (DDR) memory bus, Small Computer System Interface (SCSI), a dual in-line memory module (DIMM) interface (e.g., DIMM socket interface that supports DDR), etc. The physical host interface can be used to transmit data between the host system 105 and the memory sub-system 110. The host system 105 can further utilize a non-volatile memory Express (NVMe) interface to access the components (e.g., memory device(s) 130) when the memory sub-system 110 is coupled with the host system 105 by the PCIe interface. The physical host interface can provide an interface for passing control, address, data, and other signals between the memory sub-system 110 and the host system 105. FIG. 1 illustrates a memory sub-system 110 as an example. In general, the host system 105 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device(s) 140) can be, but are not limited to, random access memory (RAM), such as dynamic RAM (DRAM) and synchronous DRAM (SDRAM).

Some examples of non-volatile memory devices (e.g., memory device(s) 130) includes a negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric RAM (FeRAM), magneto RAM (MRAM), Spin Transfer Torque (STT)-MRAM, conductive bridging RAM (CBRAM), resistive random access memory RRAM, oxide based RRAM (OxRAM), negative-or (NOR) flash memory, and electrically erasable programmable ROM (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination of such. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), a digital signal processor (DSP)), or other suitable processor.

The memory sub-system controller 115 can include a processor 120 (e.g., a processing device) configured to execute instructions stored in a local memory 125. In the illustrated example, the local memory 125 of the memory sub-system controller 115 includes an embedded memory configured to store instructions for performing various processes, operations, logic flows, and routines that control operation of the memory sub-system 110, including handling communications between the memory sub-system 110 and the host system 105.

In some embodiments, the local memory 125 can include memory registers storing memory pointers, fetched data, etc. The local memory 125 can also include ROM for storing micro-code. While the example memory sub-system 110 in FIG. 1 has been illustrated as including the memory sub-system controller 115, in another example of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 105 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 105 via the physical host interface. The host interface circuitry can convert the commands received from the host system into command instructions to access the memory devices 130 as well as convert responses associated with the memory devices 130 into information for the host system 105.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 includes a performance manager 150 that can handle communications between the memory sub-system 110 and the host system 105. Some memory sub-systems 110 can include more than one processing core to perform operations. For example, the memory sub-system 110 can include a frontend processing core to monitor bandwidth available to a backend processing core. The frontend processing core can, based on an amount of bandwidth available, store data received from a host system to a buffer. Once the backend core has a requisite amount of bandwidth available, the access operation associated with the data stored to the buffer can be performed or more slots of the buffer may be allocated to the host system. Temporarily storing data to the Allocating slots of a buffer for temporarily storing data to a host system or the frontend can mitigate performance issues otherwise incurred due to fluctuations in available bandwidth.

In some embodiments, the memory sub-system controller 115 includes at least a portion of the performance manager 150. For example, the memory sub-system controller 115 can include a processor 120 (e.g., a processing device) configured to execute instructions stored in local memory 125 for performing the operations described herein. In some embodiments, the performance manager 150 is part of the host system 105, an application, or an operating system.

To mitigate performance issues incurred due to fluctuations in available bandwidth, the performance manager 150 can be configured to allocate slots of a buffer based on an amount of bandwidth available to the backend is above a performance threshold. For example, if an amount of bandwidth available to the backend fluctuates during an access operation, the data may not be effectively written to the associated memory cells. Data associated with an access operation can be stored to a buffer before being written. The allocation of slots of that buffer can signal to the host system how many write operations the memory device can handle for the time being. When the performance manager 150 identifies that the backend core possesses the requisite bandwidth to perform the associated command, the command can be issued (e.g., performed by the backend core). Utilizing a buffer as temporary storage for access commands can improve the overall processing capabilities of the memory sub-system 110.

Figure 2:
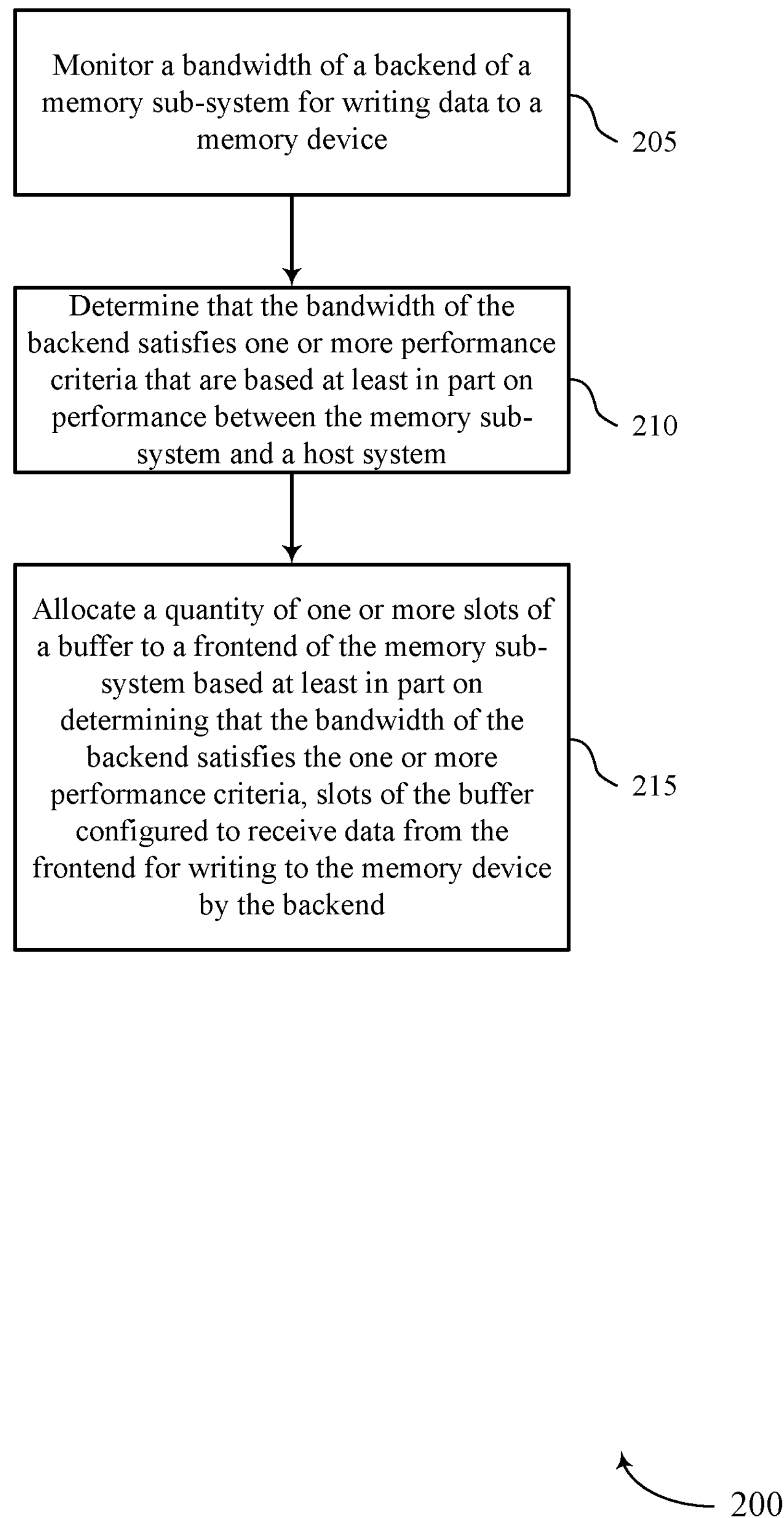
FIG. 2 is a flow diagram of an example method for performance control for a memory sub-system in accordance with some embodiments of the present disclosure.

FIG. 2 is a flow diagram of an example method 200 for performance control for a memory sub-system in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination of such. In some embodiments, the method 200 is performed by the performance manager 150 of FIG. 1. Although shown in a particular sequence or order, unless otherwise specified, the order of the processes can be modified. The illustrated embodiments should be understood only as examples, and the illustrated processes can be performed in a different order, and some processes can be performed in parallel. Additionally, one or more processes can be omitted in various embodiments. Not all processes are required in every example. Other method flows are possible.

At operation 205, the processing logic monitors a bandwidth of a backend of a memory sub-system for writing data to a memory device. The bandwidth can be based on the global logical saturation, the global physical saturation, the local logical saturation, the local physical saturation, or the combination of such. In some examples, the performance criteria can include the performance threshold, and allocating the quantity slots can include allocating a first quantity slots based on the bandwidth of the backend exceeding the performance threshold. The processing logic can determine that the bandwidth of the backend exceeds a performance threshold.

At operation 210, the processing logic determines that the bandwidth of the backend satisfies one or more performance criteria that are based on performance between the memory sub-system and a host system. The performance criteria can include a performance threshold.

At operation 215, the processing logic allocates a quantity of one or more slots of a buffer to a frontend of the memory sub-system based on determining that the bandwidth of the backend satisfies the one or more performance criteria. The slots of the buffer can be configured to receive data from the frontend for writing to the memory device by the backend. In some embodiments, the first quantity can be less than a second quantity of slots allocated when the bandwidth is less than the performance threshold.

In some embodiments, the processing logic determines a compensation parameter based on the bandwidth of the backend relative to the one or more performance criteria. A quantity of slots allocated to the frontend can be based on on the compensation parameter. In some embodiments, the processing logic determines the quantity of slots of the buffer to allocate to the frontend based on determining the compensation parameter. Allocating the quantity slots can be based on determining the quantity.

In some embodiments, the processing logic identifies a global logical saturation, a global physical saturation, a local logical saturation, a local physical saturation, or a combination of such of the memory sub-system. In some embodiments, the processing logic identifies an amount of valid blocks of a transfer unit of the memory device of the memory sub-system. The bandwidth can be based on the amount of valid blocks of the transfer unit.

The processing logic can receive a command to write data to the memory device of the memory sub-system. The command can be received by the frontend and can be received from the host system. The processing logic can identify whether slots of the buffer are allocated to the frontend to receive data for write operations. In some embodiments, allocating the quantity of slots of the buffer can be based on identifying whether the one or more slots of the buffer are allocated.

In some embodiments, the processing logic stores the data written to the memory device in the slots of the buffer. The processing logic can store the data based on identifying that the one or more slots are allocated. In some embodiments, a translation layer is configured to allocate the quantity of one or more slots to the frontend. A slot of the buffer can be configured to store four kilobytes of data.

Figure 3:
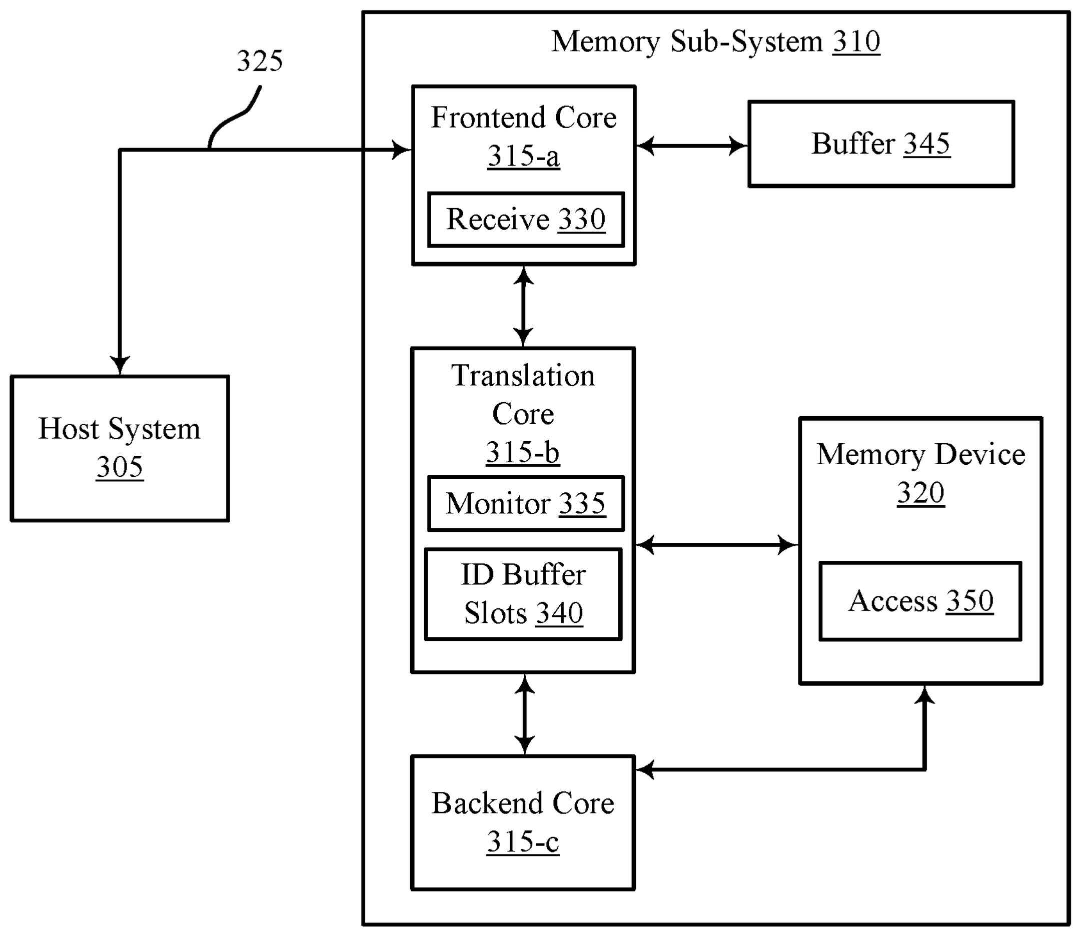
FIG. 3 is a block diagram of an example system for performance control for a memory sub-system in accordance with some embodiments of the present disclosure.

FIG. 3 is a block diagram of an example system 300 for performance control for a memory sub-system in accordance with some embodiments of the present disclosure. The system 300 can include a host system 305 in communication with a memory sub-system 310. The host system 305 can be an example of the host system 105 described with reference to FIG. 1. The memory sub-system 310 can be an example of the memory sub-system 110 described with reference to FIG. 1. The components of the memory sub-system 310 can receive and transmit communications associated with an access operation (e.g., a read operation and/or a write operation).

In some embodiments, access operations performed on the memory device 320 can be performed on one or more memory cells (e.g., NAND memory cells). Other operations, such as garbage collection operations, can also be performed on the memory cells of the memory device 320. For example, during a garbage collection procedure, a source block (e.g., a set of data of a set of memory cells or a set of memory cells) can include pages of stale data (e.g., old data that was previously written but is no longer associated with a valid logical address, pages with valid data, and pages that contain no data). During garbage collection, valid data of the block to be erased and written (e.g., re-written) to the memory device 320 (e.g., to a different page of the memory device). Operations such as access operations and garbage collection operations can be performed by firmware of the memory sub-system 310. For example, the backend core 315-*c* can be associated with firmware that is configured to perform the operations. In other examples, the frontend core 315-*a* and backend core 315-*c* can interface with a translation core 315-*b*, which can interface between operations performed by the frontend core 315-*a* and the backend core 315-*c*.

In some examples, a frontend core 315-*a* can refer to firmware (e.g., a portion of firmware) that is configured as an interface between the host system 305 and the memory sub-system 310. For example, a frontend core 315-*a* can be configured to receive, process, and/or interpret commands and other communications received from the host system 305 and transmitted to the host system 305. Additionally or alternatively, a backend core 315-*c* can refer to firmware (e.g., a portion of firmware) that is configured to interface between the memory sub-system 310 and the memory device 320 of the memory sub-system. For example, the backend core 315-*c* can be configured to receive, process, and/or interpret data and other communications received from the memory device 320 and transmitted to the memory device 320. In some examples, the frontend core 315-*a* and the backend core 315-*c* can communicate directly (e.g., directly with the other) or via a translation core 315-*b* (e.g., a translation layer).

Hardware and firmware of the memory sub-system 310 may have operational constraints that limit certain operations. That is, the memory sub-system 310 can have a finite amount of bandwidth to perform operations during any given period of time. Certain operations can have fixed timings, which result in a fixed amount of bandwidth used by the memory sub-system 310. For example, the amount of time needed to erase one or more memory cells of the memory device 320 can be fixed. Because an amount of valid data in a source block associated with an operation (e.g., an access operation) is variable, the amount of bandwidth of the memory sub-system 310 that is available can fluctuate. Fluctuating bandwidth can, in turn, limit the amount of bandwidth the memory sub-system 310 has for other operations (e.g., concurrent operations). Exceeding the bandwidth of the system can lead to long delays or errors being introduced during the operations. Techniques to manage bandwidth and the in-flow of operations to be performed on an array of memory cells may be desirable. The present system can prevent fluctuating bandwidth by allocating slots (e.g., positions) in the buffer 345 for data to be written to the memory device 320. The buffer 345 can receive the data from the frontend core 315-*a* and can be written to the memory device 320 by the backend core 315-*c*. As described herein, the frontend core 315-*a* and the backend core 315-*c* can communicate via a translation core 315-*b*.

The system 300 can include host system 305 in communication with memory sub-system 310. Memory sub-system 310 can include frontend core 315-*a*, a translation core 315-*b*, a backend core 315-*c*, and a memory device 320. The frontend core 315-*a*, the translation core 315-*b*, and the backend core 315-*c* of memory sub-system 310 can be examples of processing cores associated with a translation manager of the memory sub-system 310. The translation core 315-*b*, in some examples, can be a same core as the frontend core 315-*a* or, in other examples, can be a separate core. In some embodiments, the frontend core 315-*a* can include multiple cores (e.g., four (4) cores), the translation core 315-*b* can include multiple cores (e.g., four (4) cores), and the backend core 315-*c* can include multiple cores (e.g., four (4) cores). The memory sub-system 310 can include firmware that includes a frontend manager (e.g., a frontend layer), a translation manager, and a backend manager, each being associated with the respective processing cores.

The host system 305 can issue an access command 325 (e.g., a read command, write command, or other type of command) to write data to the memory device 320 of the memory sub-system 310. At operation 330, the memory sub-system 310 can receive the access command 325 to write data to the memory device 320 on behalf of the host system 305.

At operation 335, the translation core 315-*b* can monitor the bandwidth of the backend core 315-*c* of the memory sub-system 310. The backend core 315-*c* can be responsible for performing operations (e.g., access operations) on the memory device 320 and can susceptible to performance limitations due to the amount of bandwidth available. When certain access operations are being performed by the backend core 315-*c*, less bandwidth can be available for other operations. For example, when the backend core 315-*c* is performing a relatively large quantity of operations and/or when the backend core 315-*c* is performing a relatively large operation (e.g., an operation on a relatively large quantity of memory cells), less bandwidth can be available. Monitoring the bandwidth of the backend core 315-*c* can prevent the memory sub-system 310 from experiencing undesirable performance due to the system not having enough bandwidth to perform a subsequent operation (e.g., a host write operation). In some examples, the frontend core 315-*a* can monitor the bandwidth of the backend core 315-*c* via the translation core 315-*b*.

To control the performance of the memory sub-system 310, the buffer 345 can be configured to receive data from the frontend core 315-*a* or from the host system 305 or both for writing to the memory device 320 by the backend core 315-*c*. That is, when certain performance criteria are met (e.g., when the available bandwidth falls above or below a performance threshold), data to be written to the memory device 320 can be stored to the buffer 345. The buffer 345 can be an example of a memory device. In some embodiments, the buffer 345 can be accessible by one or more of the frontend cores 315-*a* or the host system. The instructions received from the host system 305 or performed by the frontend cores 315-*a* may be based on the quantity of slots of the buffer 345 made available to the host system 305 or the frontend cores 315-*a*. Data can be stored to the buffer 345 for use in an access operation (e.g., a host write operation). The data can be stored temporarily such that it can be subsequently written to the memory device 320 by the backend core 315-*a*.

In some examples, the data can be stored in one or more slots of the buffer 345 that are allocated by the frontend core 315-*a*. That is, the frontend core 315-*a* (e.g., via the translation core 315-*b*) can monitor the amount of bandwidth available to the backend core 315-*c* and can allocate buffer slots to manage the overall usage of the backend core(s) 315-*c*. In some examples, the data stored to the buffer 345 can be associated with a host write operation and/or can be associated with multiple access operations. In some cases, reducing the quantity of slots of the buffer 345 can be a way to signal to the frontend or the host system 305 that the memory device 310 is busy performing other operations. In this manner, problems associated with overburdening the backend of the memory device 310 may be avoided because the host system 305 or the frontend may not be able to request additional operation when the slots of the buffer 345 are not allocated. In effect, when the processing resources of the backend of the memory device 310 becomes saturated, one or more slots of the buffer 345 may be deallocated from the host system 305 to signal to the host system 305 that the memory device 310 is not available for new commands (e.g., new host write commands). If the host system 305 does not identify any available and allocated slots of the buffer 345, the host system 305 may refrain from send additional commands (e.g., host write commands).

At operation 340, the translation core 315-*b* of the memory sub-system 310 can identify slots of the buffer 345 for storing data. In some examples, each slot of the buffer 345 can be configured to store four kilobytes (4 KB) of data. Because an access operation is associated with a finite amount of data, the translation core 315-*b* can identify buffer slots (e.g., an amount of buffer slots) that are available to store the data. For example, the memory sub-system 310 can receive a host write command for 512 KB of data. Accordingly, the translation core 315-*b* can identify 128 available buffer slots based on the amount of bandwidth available to the backend core 315-*c*. In some examples, the translation core 315-*b* can identify slots of the buffer 345 via the frontend core 315-*a*.

At operation 350, an access operation can be performed on the memory device 320. In some embodiments, the data associated with the access command can be stored in the buffer 345 until the backend is available to perform the command or one or more performance (e.g., bandwidth) determinations are made. For example, when data is stored to the buffer 345, the access operation can be performed once enough bandwidth is available to the backend core 315-*c*.

In some embodiments, utilizing the backend core 315-*c* to perform the access operation can allow the frontend core 315-*a* to continue processing incoming access commands, while the translation core 315-*b* monitors bandwidth available to the backend core 315-*c*, allocates slots of the buffer 345 for data and the like to the frontend core 315-*a* or the host system 305 or both. That is, the buffer 345 can be accessible by the backend core 315-*c* (e.g., via the translation core 315-*b*), and the backend core can perform the operation 350 (e.g., the access operation) on the memory device 320. The backend core 315-*c* can, in some examples, communicate directly with the memory device 320 via one or more communication channels. Similarly, the backend core 315-*c* can communicate with the buffer 345 via one or more communication channels. Using the backend core 315-*c* to perform the operation 350 can improve the overall performance of the memory sub-system 310 by limiting the amount of fluctuation in bandwidth the backend core 315-*c* experiences when performing an access operation.

In some examples, the translation core 315-*b* can determine a compensation parameter. The compensation parameter can be based on the bandwidth available to the backend core 315-*c* relative to the one or more performance criteria. For example, it can be desirable for the memory sub-system 310 to experience relatively high performance. That is, it can be desirable for the memory sub-system 310 to have a relatively high amount of bandwidth available for performing an access operation (i.e., a higher amount of bandwidth available than necessary). In such an example, the compensation parameter may be representative of the desired performance of the memory sub-system. In other examples, the amount of bandwidth available may be only enough for the backend core 315-*c* to perform the access operation.

The translation core 315-*b* can determine the quantity of slots of the buffer 345 to allocate based on the compensation parameter. That is, the translation core 315-*b* can occupy each of the slots of the buffer 345 and can selectively release slots for storing access commands. The translation core 315-*b* can release the slots to the frontend core 315-*a* for storing the access commands or data associated with the access commands. For example, the compensation parameter may indicate that the translation core 315-*b* is to allocate more or fewer slots to the frontend cores 315-*a* or the host device 305 or both. The host system 305 may not issue new commands to the memory device 310 if a slot of the buffer 345 is not available to the host device 305. By limiting the quantity of slots allocated to the frontend cores 315-*a*, the translation core 315-*b* may control a quantity of operations being executed by the memory device 310 and may manage the operational bandwidth of the memory device 310, including the operational bandwidth of the backend core 315-*c*.

The amount of data stored to the buffer before being written to the memory device 320 can be based on the compensation parameter and whether the available bandwidth exceeds a performance threshold. That is, the translation core 315-*b* can compare an amount of bandwidth available to the backend core 315-*c* to a performance threshold. In some examples, if the amount of bandwidth available exceeds the performance threshold, slots of the buffer 345 can be allocated for data received from the host system 305. In other examples, if the amount of bandwidth available does not exceed the performance threshold, the translation core 315-*b* (e.g., via the frontend core 315-*a*) can indicate such to the host system 305. In such scenarios, the host system 305 may temporarily postpone transmitting access commands to the frontend core 315-*a* based on slots being allocated or not. In some examples, the performance threshold can be a dynamic value. That is, the backend core 315-*c* can have a finite amount of bandwidth available, and any given access operation can require a finite amount of bandwidth to be performed. Accordingly, if the amount of bandwidth needed to perform a given access operation exceeds an amount of bandwidth available, host system 305 may be notified to temporarily postpone transmitting access commands until additional bandwidth is available.

In some examples, the frontend core 315-*a* can identify a global logical saturation, a global physical saturation, a local logical saturation, or a local physical saturation, of the memory sub-system 310. The bandwidth available to the backend core 315-*c* can be based on any of the global logical saturation, the global physical saturation, the local logical saturation, or the local physical saturation.

Figure 4:
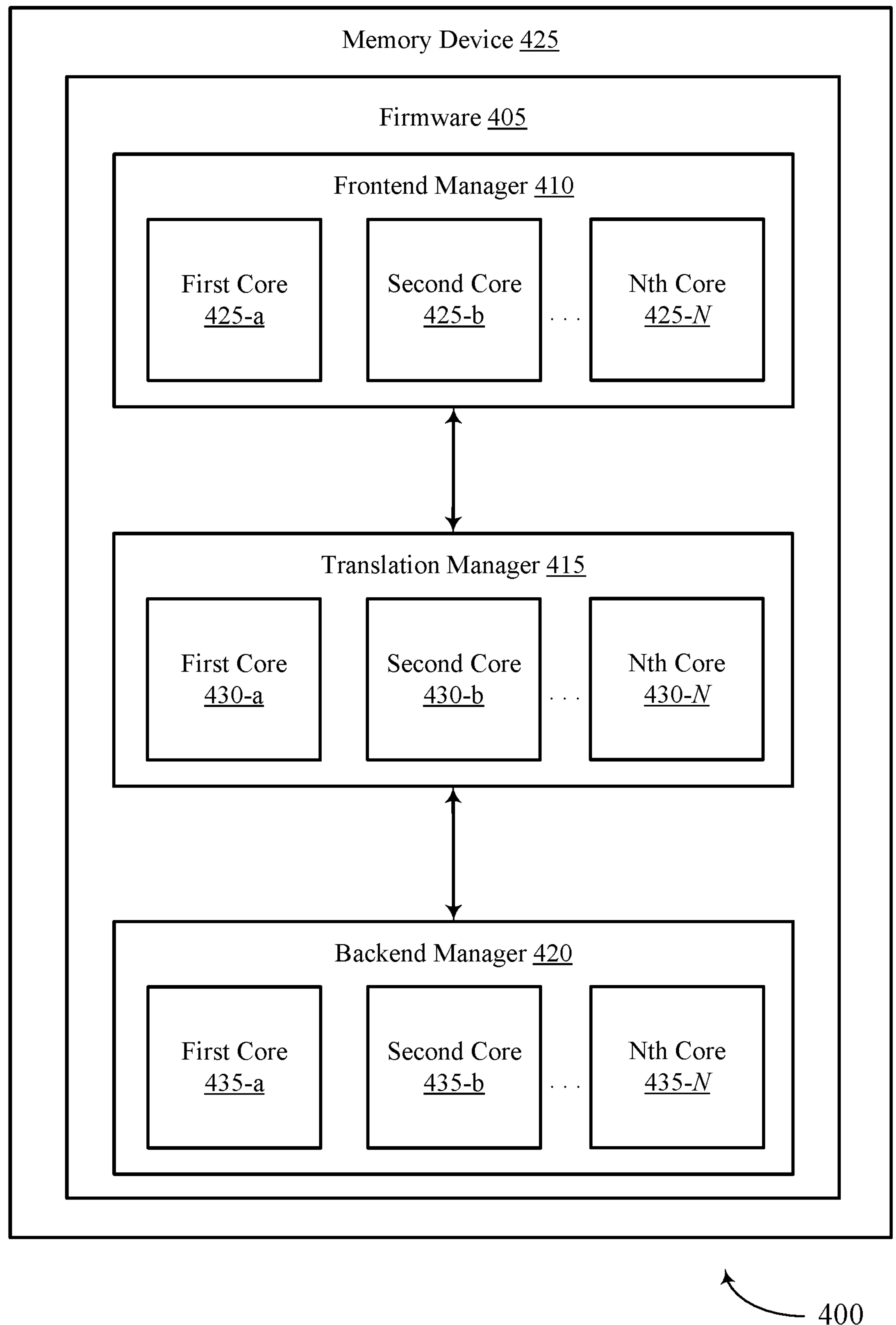
FIG. 4 is a block diagram of an example memory sub-system for performance control for a memory sub-system in accordance with some embodiments of the present disclosure.

FIG. 4 is a block diagram of an example memory sub-system 400 for performance control for a memory sub-system in accordance with some embodiments of the present disclosure. A memory sub-system can include firmware 405. The firmware 405 can include a frontend manager 410 (sometimes referred to as a frontend layer), a translation manager 415 (sometimes referred to as a flash translation layer or FTL), and a backend manager 420 (sometimes referred to as a backend layer). A core may be an example of a processor (e.g., processor 120), one or more portions of a processor, a processing device (e.g., processing device 505), one or more portions of a processing device, or combinations of such, as described herein. A core may be any circuit, processor, hardware, or device configured to execute one or more instructions to perform one or more operations.

Frontend manager 410 can be configured as an interface between the host system and the memory sub-system. For example, the frontend manager 410 can be configured to receive, process, and/or interpret commands and other communications received from the host system and transmitted to the host system. One or more cores 425 can be used to perform the functions of the frontend manager 410. For example, a first core 425-*a*, a second core 425-*b*, and an Nth core 425-N can be used to implement the functions of the frontend manager 410. In some embodiments, these cores 425 are dedicated to performing the functions of the frontend manager 410. In some embodiments, one or more these cores 425 can be used to perform the functions of the frontend manager 410, the translation manager 415, or the backend manager 420, or combinations of such. N can represent any positive integer of cores.

Backend manager 420 can be configured as an interface between the memory sub-system and the memory device of the memory sub-system. For example, the backend manager 420 can be configured to receive, process, and/or interpret data and other communications received from the memory device and transmitted to the memory device. One or more cores 435 can be used to perform the functions of the backend manager 420. For example, a first core 435-*a*, a second core 435-*b*, and an Nth core 435-N can be used to implement the functions of the backend manager 420. In some embodiments, these cores 435 are dedicated to performing the functions of the backend manager 420. In some embodiments, one or more these cores 435 can be used to perform the functions of the frontend manager 410, the translation manager 415, or the backend manager 420, or combinations of such. N can represent any positive integer of cores.

Translation manager 415 can be configured as an interface between the frontend manager 410 and the backend manager 420. In some implementations, the commands and signaling scheme used by the host system can be different than the command and signaling scheme used by the memory device. To facilitate communications between the host system and the memory device that stores data on behalf of the host system, the translation manager 415 can translate or otherwise convert host system information to memory device information and vice-versa. One or more cores 430 can be used to perform the functions of the translation manager 415. For example, a first core 430-*a*, a second core 430-*b*, and an Nth core 430-N can be used to implement the functions of the translation manager 415. In some embodiments, these cores 430 are dedicated to performing the functions of the translation manager 415. In some embodiments, one or more these cores 430 can be used to perform the functions of the translation manager 415, the translation manager 415, or the backend manager 420, or combinations of such. N can represent any positive integer of cores.

The frontend core 315-*a*, the translation core 315-*b*, and the backend core 315-*c* described with reference to FIG. 3 can be examples of the core 425, the core 430, and the core 435 of the frontend manager 410, the translation manager 415, and the backend manager 420, respectively. In such examples, the frontend core 315-*a* can receive access commands, and the translation core 315-*b* can monitor the amount of bandwidth available to the backend core 315-*c*. Based on the amount of bandwidth available, the translation manager 415 can allocate particular slots of the buffer for storing data associated with the access operation. By changing a quantity of the slots of the buffer that are allocated that may affect how many access operations are in a queue for being performed by the memory device (including the backend manager 420). When the translation core 315-*b* identifies that the backend core 315-*c* possesses a requisite bandwidth to perform the access operation, the access operation can be performed. In some examples, the access operation can be performed based on the frontend core 315-*a* reading the associated data from the buffer and providing the data to the backend core 315-*c*. In some examples, the data can be passed from the frontend core 315-*a* to the backend core 315-*c* by way of the translation manager 415 (e.g., the translation core 315-*b*).

In some instances, any of the Nth cores 430-N can monitor the bandwidth of the backend core 315-*c*. In some instances, the first core 430-*a* of the translation manager 415 can monitor the bandwidth of the backend core 315-*c* and allocate slots of the buffer based on the bandwidth of the backend core 315-*c*. The host system can store data to be written in the memory device in the buffer. An access operation stored in the buffer can be performed by one or more cores 430 of the translation manager 415, one or more cores 435 of the backend manager 420, the memory device, or combinations of such. For example, one or more cores 430 and one or more cores 435 can be used to perform an access operation based on a core 425 indicating that a requisite amount of bandwidth is available to perform the operation. In some embodiments, one or more cores 435 of the backend manager 420 perform the associated access operation.

Figure 5:
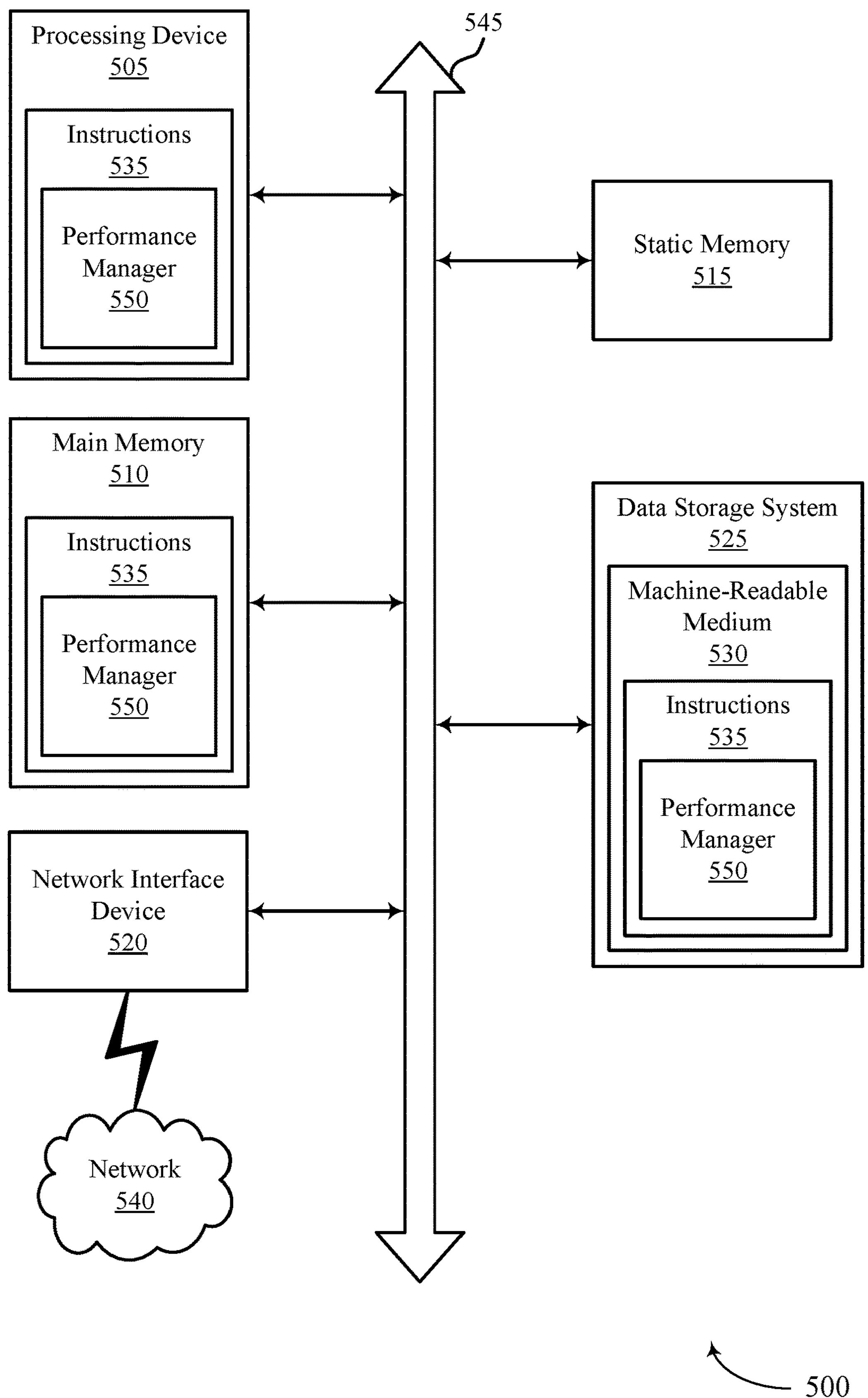
FIG. 5 is a block diagram of an example computer system in which embodiments of the present disclosure can operate.

FIG. 5 illustrates a block diagram of an example computer system 500 in which embodiments of the present disclosure can operate. The computer system 500 can include a set of instructions, for causing the machine to perform any one or more of the techniques described herein. In some embodiments, the computer system 500 can correspond to a host system (e.g., the host system 105 described with reference to FIG. 1) that includes, is coupled with, or utilizes a memory sub-system (e.g., the memory sub-system 110 described with reference to FIG. 1) or can be used to perform the operations of a controller (e.g., to execute an operating system to perform operations corresponding to the performance manager 150 described with reference to FIG. 1). In some embodiments, the machine can be connected (e.g., networked) with other machines in a local area network (LAN), an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" can also include any collection of machines that individually or jointly execute a set (or multiple sets) of instructions to perform any one or more of the methodologies discussed herein.

The example computer system 500 can include a processing device 505, a main memory 510 (e.g., ROM, flash memory, DRAM such as SDRAM or Rambus DRAM (RDRAM), etc.), a static memory 515 (e.g., flash memory, static RAM (SRAM), etc.), and a data storage system 525, which communicate with each other via a bus 545.

Processing device 505 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 505 can also be one or more special-purpose processing devices such as an ASIC, an FPGA, a DSP, network processor, or the like. The processing device 505 is configured to execute instructions 535 for performing the operations and steps discussed herein. The computer system 500 can further include a network interface device 520 to communicate over the network 540.

The data storage system 525 can include a machine-readable storage medium 530 (also known as a computer-readable medium) on which is stored one or more sets of instructions 535 or software embodying any one or more of the methodologies or functions described herein. The instructions 535 can also reside, completely or at least partially, within the main memory 510 and/or within the processing device 505 during execution thereof by the computer system 500, the main memory 510 and the processing device 505 also constituting machine-readable storage media. The machine-readable storage medium 530, data storage system 525, and/or main memory 510 can correspond to a memory sub-system.

In one example, the instructions 535 include instructions to implement functionality corresponding to a performance manager 550 (e.g., the performance manager 150 described with reference to FIG. 1). While the machine-readable storage medium 530 is shown as a single medium, the term "machine-readable storage medium" can include a single medium or multiple media that store the one or more sets of instructions. The term "machine-readable storage medium" can also include any medium that is capable of storing or encoding a set of instructions for execution by the machine and that cause the machine to perform any one or more of the methodologies of the present disclosure. The term "machine-readable storage medium" can include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, ROMs, RAMs, EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as ROM, RAM, magnetic disk storage media, optical storage media, flash memory components, etc.

In the foregoing specification, examples of the disclosure have been described with reference to specific example examples thereof. It will be evident that various modifications can be made thereto without departing from the broader scope of examples of the disclosure as set forth in the following claims. The specification and drawings are, accordingly, to be regarded in an illustrative sense rather than a restrictive sense.

What is claimed is:

1. A method, comprising:

monitoring, by one or more processing cores of a memory sub-system, a bandwidth of a backend of the memory sub-system for writing data to a memory device, wherein the bandwidth is based at least in part on a quantity of commands processed by the backend of the memory sub-system over a duration and a quantity of occupied slots of a buffer associated with a frontend of the memory sub-system, wherein the slots of the buffer are configured to receive data from the frontend for writing to the memory device by the backend;

determining, by the one or more processing cores, that the bandwidth of the backend satisfies one or more performance criteria that are based at least in part on performance between the memory sub-system and a host system that is external to the memory sub-system;

transmitting signaling to the host system based at least in part on determining that the bandwidth of the backend satisfies the one or more performance criteria, wherein the signaling comprises instructions for the host system to continue transmitting access commands to the memory sub-system; and allocating, by the one or more processing cores, a quantity of one or more slots of the buffer to the frontend of the memory sub-system based at least in part on determining that the bandwidth of the backend satisfies the one or more performance criteria and transmitting the signaling to the host system, wherein the quantity of slots allocated for the buffer associated with the frontend is based at least in part on the bandwidth relative to the one or more performance criteria.

2. The method of claim 1, further comprising:

determining a compensation parameter based at least in part on the bandwidth of the backend relative to the one or more performance criteria, wherein the quantity of one or more slots allocated to the frontend is based at least in part on the compensation parameter.

3. The method of claim 2, further comprising:

determining the quantity of one or more slots of the buffer to allocate to the frontend based at least in part on determining the compensation parameter, wherein allocating the quantity of one or more slots is based at least in part on determining the quantity of one or more slots.

4. The method of claim 1, further comprising:

determining that the bandwidth of the backend exceeds a performance threshold, wherein the one or more performance criteria comprises the performance threshold, and wherein allocating the quantity of one or more slots comprises allocating a first quantity of one or more slots based at least in part on the bandwidth of the backend exceeding the performance threshold, the first quantity being less than a second quantity of one or more slots allocated when the bandwidth is less than the performance threshold.

5. The method of claim 1, further comprising:

identifying a global logical saturation, a global physical saturation, a local logical saturation, a local physical saturation, or a combination of such of the memory sub-system, wherein the bandwidth is based at least in part on the global logical saturation, the global physical saturation, the local logical saturation, the local physical saturation, or the combination of such.

6. The method of claim 1, wherein monitoring the bandwidth further comprises:

identifying an amount of valid blocks of a transfer unit of the memory device of the memory sub-system, wherein the bandwidth is based at least in part on the amount of valid blocks of the transfer unit.

7. The method of claim 1, further comprising:
receiving, by the frontend and from the host system, a command to write data to the memory device of the memory sub-system; and
identifying whether one or more slots of the buffer are allocated to the frontend to receive data for write operations, wherein allocating the quantity of one or more slots of the buffer is based at least in part on identifying whether the one or more slots of the buffer are allocated.

8. The method of claim 7, further comprising:
storing the data writing to the memory device in the one or more slots of the buffer based at least in part on identifying that the one or more slots are allocated.

9. The method of claim 1, wherein a translation layer is configured to allocate the quantity of one or more slots to the frontend.

10. The method of claim 1, wherein a slot of the buffer is configured to store four kilobytes of data.

11. A system, comprising:
a plurality of memory components; and
a processing device, operatively coupled with the plurality of memory components, to:
monitor a bandwidth of a backend of a memory sub-system for writing data to a memory device, wherein the bandwidth is based at least in part on a quantity of commands processed by the backend of the memory sub-system over a duration and a quantity of occupied slots of a buffer associated with a frontend of the memory sub-system, wherein the slots of the buffer are configured to receive data from the frontend for writing to the memory device by the backend;
determine that the bandwidth of the backend satisfies one or more performance criteria that are based at least in part on performance between the memory sub-system and a host system that is external to the memory sub-system;
transmit signaling to the host system based at least in part on determining that the bandwidth of the backend satisfies the one or more performance criteria, wherein the signaling comprises instructions for the host system to continue transmitting access commands to the memory sub-system; and
allocate a quantity of one or more slots of the buffer to the frontend of the memory sub-system based at least in part on determining that the bandwidth of the backend satisfies the one or more performance criteria and transmitting the signaling to the host system, wherein the quantity of slots allocated for the buffer associated with the frontend is based at least in part on the bandwidth relative to the one or more performance criteria.

12. The system of claim 11, further comprising:
the processing device further to:
determine a compensation parameter based at least in part on the bandwidth of the backend relative to the one or more performance criteria, wherein the quantity of one or more slots allocated to the frontend is based at least in part on the compensation parameter.

13. The system of claim 12, further comprising:
the processing device further to:
determine the quantity of one or more slots of the buffer to allocate to the frontend based at least in part on determining the compensation parameter, wherein allocating the quantity of one or more slots is based at least in part on determining the quantity of one or more slots.

14. The system of claim 11, further comprising:
the processing device further to:
determine that the bandwidth of the backend exceeds a performance threshold, wherein the one or more performance criteria comprises the performance threshold, and wherein allocating the quantity of one or more slots comprises allocating a first quantity of one or more slots based at least in part on the bandwidth of the backend exceeding the performance threshold, the first quantity being less than a second quantity of one or more slots allocated when the bandwidth is less than the performance threshold.

15. The system of claim 11, further comprising:
the processing device further to:
identify a global logical saturation, a global physical saturation, a local logical saturation, a local physical saturation, or a combination of such of the memory sub-system, wherein the bandwidth is based at least in part on the global logical saturation, the global physical saturation, the local logical saturation, the local physical saturation, or the combination of such.

16. The system of claim 11, further comprising:
the processing device further to:
identify an amount of valid blocks of a transfer unit of the memory device of the memory sub-system, wherein the bandwidth is based at least in part on the amount of valid blocks of the transfer unit.

17. The system of claim 11, further comprising:
the processing device further to:
receive, by the frontend and from the host system, a command to write data to the memory device of the memory sub-system; and
identify whether one or more slots of the buffer are allocated to the frontend to receive data for write operations, wherein allocating the quantity of one or more slots of the buffer is based at least in part on identifying whether the one or more slots of the buffer are allocated.

18. The system of claim 11, wherein a translation layer is configured to allocate the quantity of one or more slots to the frontend.

19. The system of claim 11, wherein a slot of the buffer is configured to store four kilobytes of data.

20. A non-transitory computer-readable storage medium comprising instructions that, when executed by a processing device, cause the processing device to:
monitor a bandwidth of a backend of a memory sub-system for writing data to a memory device, wherein the bandwidth is based at least in part on a quantity of commands processed by the backend of the memory sub-system over a duration and a quantity of occupied slots of a buffer associated with a frontend of the memory sub-system, wherein the slots of the buffer are configured to receive data from the frontend for writing to the memory device by the backend;
determine that the bandwidth of the backend satisfies one or more performance criteria that are based at least in part on performance between the memory sub-system and a host system that is external to the memory sub-system;
transmit signaling to the host system based at least in part on determining that the bandwidth of the backend satisfies the one or more performance criteria, wherein the signaling comprises instructions for the host system to continue transmitting access commands to the memory sub-system; and
allocate a quantity of one or more slots of the buffer to the frontend of the memory sub-system based at least in part on determining that the bandwidth of the backend satisfies the one or more performance criteria and transmitting the signaling to the host system, wherein the quantity of slots allocated for the buffer associated with the frontend is based at least in part on the bandwidth relative to the one or more performance criteria.

* * * * *